UNITED STATES PATENT OFFICE.

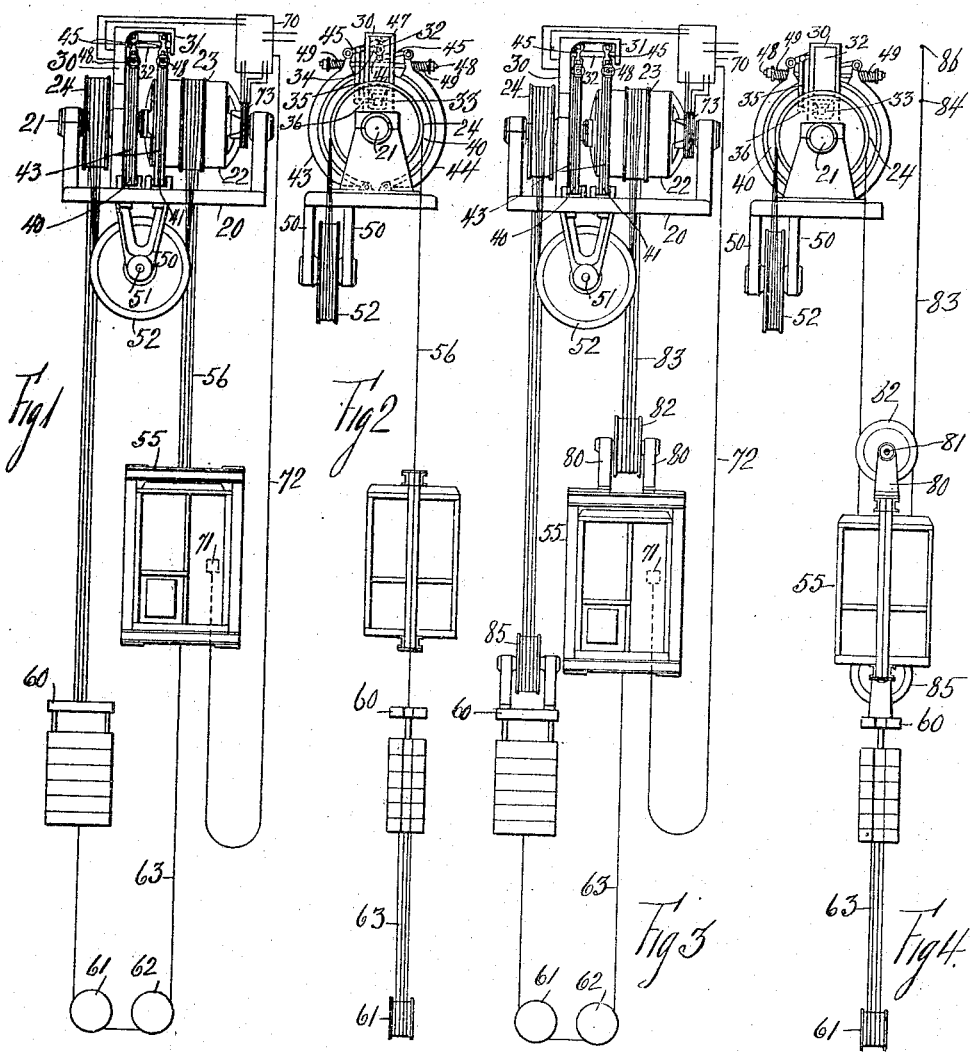

EDWARD G. PARVIN, OF ROSELLE PARK, NEW JERSEY.

ELECTRIC TRACTION-ELEVATOR.

1,206,586.  Specification of Letters Patent.  Patented Nov. 28, 1916.

Application filed August 8, 1914. Serial No. 855,721.

*To all whom it may concern:*

Be it known that I, EDWARD G. PARVIN, a citizen of the United States, and a resident of Roselle Park, in the county of Union and State of New Jersey, have invented certain new and useful Improvements in Electric Traction-Elevators, of which the following is a specification.

This invention relates to an electric traction elevator, and specifically it consists of an elevator system or hoisting apparatus that comprises one electric motor with a driving sheave incorporated with the field yoke of the motor, and a second sheave with the armature of said motor. The field yoke of the motor rotates in one direction, and the armature in an opposite direction. One of the novel results of this construction enables a motor to be designed for a speed double that of one in which the armature only rotates, resulting in a motor much lighter in weight and cheaper in construction than those in general use.

In the accompanying drawings Figure 1 shows a front view of the invention incorporated with a one to one traction elevator; Fig. 2 represents a left hand side view of Fig. 1; Fig. 3 shows a front view of the invention incorporated with a two to one traction elevator and Fig. 4 is a left hand side view of Fig. 3.

Referring to Figs. 1 and 2, a frame is indicated at 20 with a motor comprising the armature shaft 21, field yoke 22 with the driving sheave 23. A second driving sheave 24 is fastened to the armature shaft 21. A bracket 30 extends from the frame 20 and forms a bearing for the armature shaft 21. The upper end of said bracket has extending therefrom an arm 31. A rock shaft 32 is journaled in the bracket 30 and its arm 31. A solenoid with the core 33 is secured in said bracket 30. An arm 34 has one end fastened to the rock shaft 32, and its other end is pinned to a link 35, which latter in turn is pinned to an arm 36 extending from the core 33.

A brake pulley 40 is fastened to the armature shaft 21 and a brake pulley 41 is formed with the field yoke 22 of the motor. Two pairs of brake straps 43, 44 are pivoted in brackets extending up from the frame 20. At the upper ends of each brake strap is pivoted one end of a link 45. The other ends of the links are pinned to arms 46, 47 extending from the rock shaft 32. Rods 48 with springs 49 flexibly connect the upper ends of each pair of said brake straps. A pair of journal brackets 50 extend from the frame 20 and have journaled therein the axle 51 of an idler sheave 52.

An elevator cage is indicated at 55. Ropes 56 from the elevator cage pass over the driving sheave 23, then under the idler sheave 52, next over the driving sheave 24 and down to the counter weight 60. A pair of idler sheaves are indicated at 61, 62 and a rope 63 extends from the bottom of the cage 55, passes under the sheaves 62, 61 and up to the counterweight 60. A main controller is indicated at 70 and a car controller at 71. A cable 72 connects the two controllers and suitable electric wires are interposed between the main controller 70, and the collector rings 73 of the field yoke of the motor and said solenoid. In Figs. 3 and 4, the elements connected with the frame 20, motor 22, driving sheaves 23, 24, bracket 30, idler sheave 52, cage 55, controllers 70, 71, cable 72, rope 63, sheaves 61, 62, counterweight 60 and appurtenances are similar to those described. With this modified construction a pair of journal brackets 80 are supported upon the top of the cage 55 and in which is journaled the shaft 81 of an idler sheave 82. A rope 83 is anchored at 84, passes under the sheave 82, up over the driving sheave 23, down under the idler sheave 52, up over the driving sheave 24, down under a sheave 85 extending from the counterweight 60 and anchored at 86.

To start and stop the car the controller is manipulated in the usual way. Various current strengths are thereby admitted to the motor and to the solenoid 33. The solenoid 33 is on a shunt with said motor. The various current changes variously excite the said solenoid and thereby the tension of the brakes is varied by the intervention of the link 35 and the link 45.

Having described my invention what I desire to secure by Letters Patent and claim is:

1. In an apparatus of the character described the combination of a motor having a rotatable field yoke with a driving sheave thereon, a driving sheave on the armature shaft of the motor, the armature shaft rotating in a direction opposite to that of the field yoke, an idler sheave below the motor, a bracket extending from the frame of the motor, a solenoid in said bracket, a brake pulley formed with the field yoke, a brake pulley on the armature shaft, a brake strap for each brake pulley, connections between the solenoid and straps, and a cage for the apparatus and means operated by the driving sheaves to actuate the cage.

2. In an apparatus of the character described the combination of one electric motor having a rotatable field yoke, a sheave formed with the yoke, the yoke rotating in a direction opposite to the armature of the motor, a sheave fastened to the armature shaft, a brake pulley on the shaft of the armature, a brake pulley for the field yoke, brake straps for the brake pulleys, a rock shaft between said brake pulleys, a link connecting each of the brake straps to the rock shaft, a solenoid for the brake straps, and connections between said rock shaft and solenoid to operate the rock shaft and thereby the brake straps.

Signed at Roselle Park in the county of Union and State of New Jersey this 31st day of July A. D. 1914.

EDWARD G. PARVIN.

Witnesses:
 JOHN F. TRUDEAU,
 A. A. DE BONNEVILLE.

Copies of this patent may be obtained for five cents each, by addressing the "Commissioner of Patents, Washington, D. C."